United States Patent [19]

Izutsu et al.

[11] 4,433,618
[45] Feb. 28, 1984

[54] APPARATUS FOR CONTINUOUSLY MANUFACTURING FIBROUS HIGH PROTEIN FOODS

[75] Inventors: Tadashi Izutsu, Tokorozawa; Masanobu Koutake, Sakado; Yasunobu Hiraoka, Iruma; Shin-ichi Takafuji, Kodaira; Tamotsu Yamada, Yamanashi; Seiji Kurosawa, Yamanashi; Tetsuo Satoh, Yamanashi, all of Japan

[73] Assignee: Snow Brand Milk Products Co., Ltd., Hokkaido, Japan

[21] Appl. No.: 318,246

[22] Filed: Nov. 4, 1981

[30] Foreign Application Priority Data

Nov. 13, 1980 [JP] Japan ................................ 55-159785

[51] Int. Cl.³ .......................... A23C 3/04; A23C 9/00
[52] U.S. Cl. ........................................ 99/455; 99/456; 99/464; 99/466; 99/517; 426/524; 426/580; 426/802
[58] Field of Search ............... 99/450.1, 456, 452–455, 99/460, 464, 467, 470, 483, 517, 516, 535, 466; 426/511, 516, 656, 502, 802, 580, 524, 582, 583, 276, 514; 425/72 R, 72 S, 8, 6, 112

[56] References Cited

U.S. PATENT DOCUMENTS

| | | | |
|---|---|---|---|
| 3,803,329 | 4/1974 | Valentas et al. | 426/802 X |
| 3,999,474 | 12/1976 | Sienkiewicz et al. | 426/802 X |
| 4,038,431 | 7/1977 | Hildebolt | 426/802 X |
| 4,038,432 | 7/1977 | Hildebolt et al. | 426/802 X |
| 4,039,691 | 8/1977 | Hildebolt | 426/802 X |
| 4,094,235 | 6/1978 | Castaigne et al. | 99/450.1 |
| 4,275,647 | 6/1981 | Chambers et al. | 99/450.6 |

Primary Examiner—Timothy F. Simone
Attorney, Agent, or Firm—Flynn, Thiel, Boutell & Tanis

[57] ABSTRACT

An apparatus for continuously manufacturing fibrous high protein foods comprises an apparatus for supplying a fixed quantity of fibrous structure formable food raw material from a nozzle, said food material being obtained through the steps of curdling cow's milk such as whole milk or skim milk by the addition of a coagulating agent and removing whey from the resulting curds, an apparatus for extending the raw material supplied from the supplying apparatus by applying a fixed tension thereto while delivering the raw material by the aid of free rollers and drive rollers, an apparatus for cooling the extended raw material supplied from the extension apparatus; and an apparatus for cutting the raw material supplied from the cooling apparatus in fixed lengths.

7 Claims, 7 Drawing Figures

FIG. I

APPARATUS FOR CONTINUOUSLY MANUFACTURING FIBROUS HIGH PROTEIN FOODS

FIELD OF THE INVENTION

This invention relates to an apparatus for continuously manufacturing a fibrous high protein food, and particularly to a continuous manufacturing apparatus capable of producing continuously and in large quantities a fibrous high protein food which is obtained by making a fibrous structure formable food from cow's milk or skim milk and further enhancing its degree of orientation.

BACKGROUND OF THE INVENTION

The term "high protein foods" used in this invention mainly means cheeses made from curds obtained by adding a coagulating agent to cow's milk such as whole milk or skim milk.

Curds, from which whey has been removed, are formable into a fibrous structure, but this property is extremely feeble. In view of this, the processes disclosed in Cheese and Fermented Milk Foods, 2nd Edition, or Japanese Patent Publication No. 30822/1980 have been publicly utilized for manufacturing torn dried fibrous structure chesses.

According to an example of these processes, a solidified curd is cut into small blocks by using a cutting means to thereby separate whey therefrom; next curd blocks are softened in hot water, taken out thereof and subjected to the orientation imparting treatment with mingling whereby to be made into a fibrous composition; and thereafter said curd is extruded under pressure through a conically tapered port by means of a screw or the like so as to have fiber strength.

The imparting of fiber strength to curds at the final step is achieved by the application of mechanical stress to curds using, for instance, the above mentioned process utilizing an extruder, an extending process utilizing an apparatus comprising differential rollers or the like.

In the case of increasing the fiber strength using these apparatuses, however, there take place unavoidable problems such that in the light of commodity design it is difficult to maintain the texture uniform and the shape stable, and further in the light of production technique it is difficult to increase the production capacity and reduce the range of change in commodity weights.

In other words, the use of the extruder facilitates the production of uniform-shaped commodities but is inferior in production capacity due to large pressure loss, while the use of the apparatus comprising differential rollers hinders the production of uniform-shaped commodities and is unable to obtain such commodities without lowering the production capacity. Such being the case, both apparatuses are defective in that they find difficulty in continuously producing commodities, which are high in fiber strength, uniform in texture and stable in shape, under an increased output.

SUMMARY OF THE INVENTION

It is an object of this invention to provide an apparatus which is capable of eliminating the aforesaid deficiencies inherent in the conventional manufacturing apparatuses and continuously manufacturing high protein foods, which are high in fiber strength, uniform in texture and stable in shape, under an increased output.

According to this invention, the above object can be achieved by a manufacturing apparatus comprising an apparatus for supplying a rope-like high protein food material continuously from a nozzle; an extension apparatus including drive rollers functioning to wind said rope-like raw material supplied from said supplying apparatus therearound and thus extend it and free rollers functioning to wind said raw material extended by said drive rollers therearound and thus guide it; an apparatus for cooling said raw material supplied from said extension apparatus by passing it through the coolant received in a cooling tank; and an apparatus for cutting said raw material supplied from said cooling apparatus by using a cutter.

One characteristic of the embodiment of this invention consists in that the raw material supplying apparatus includes a grooved drive roller disposed below the outlet of a nozzle and having a circular groove opposite to said nozzle and an endless belt disposed so as to move with said roller along the surface of groove in the lower part of the roller, wherein said raw material supplied continuously from the outlet of the nozzle is formed into a fixed thickness of rope-like raw material within the raw material supplying apparatus and thereafter is smoothly supplied to the extending apparatus.

Another characteristic of the embodiment of this invention consists in that the raw material supplying apparatus includes a coupling at the inlet of a nozzle, said coupling being made from an elastic substance and functioning as a buffer, wherein a fixed quantity of raw material is continuously supplied to the nozzle by the expansion or contraction of said coupling.

A further characteristic of an embodiment of this invention consists in that the passage for said rope-like raw material in the extension apparatus is provided with an apparatus for measuring the diameter of said raw material and the extension apparatus is operated in accordance with the measured value, whereby the thickness of said raw material can be held in a substantially uniform state.

A still further characteristic of an embodiment of this invention consists in that within the cooling tank having received the coolant there are provided at least a pair of rotary drums with grooves in their periphery, and said rope-like raw material is successively wound between said drums and thus shifted, during which the raw material is sufficiently cooled and solidified.

An even further characteristic of an embodiment of this invention consists in that a rotary roller is provided for receiving said rope-like raw material from the coiling apparatus, the raw material received on this rotary roller then hangs down from the outer periphery of said roller, its hanging down length is measured by means of a measuring apparatus disposed below, and when the measured value reaches a fixed one, a cutter is operated, whereby stick-like products of fixed length can be obtained continuously.

DETAILED DESCRIPTION OF PREFERRED EMBODIMENT

Figure 1:
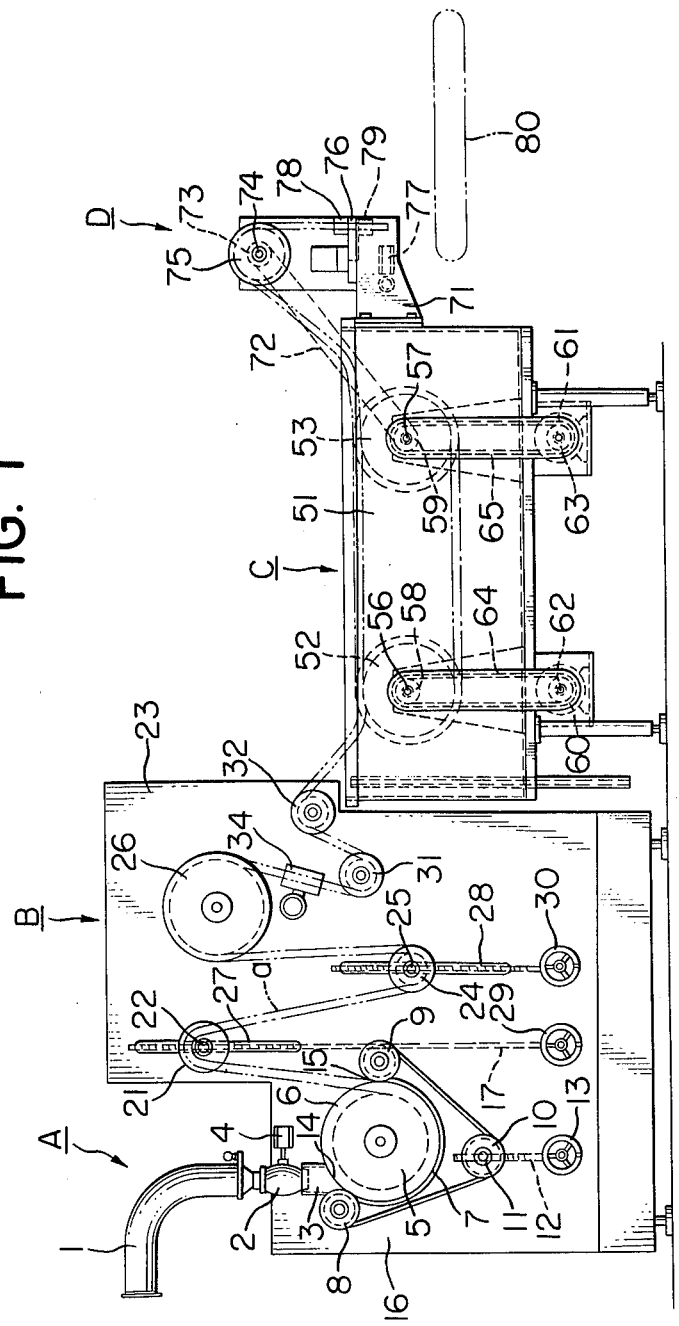
FIG. 1 is a front view of an embodiment of the manufacturing apparatus according to this invention.
Figure 2:
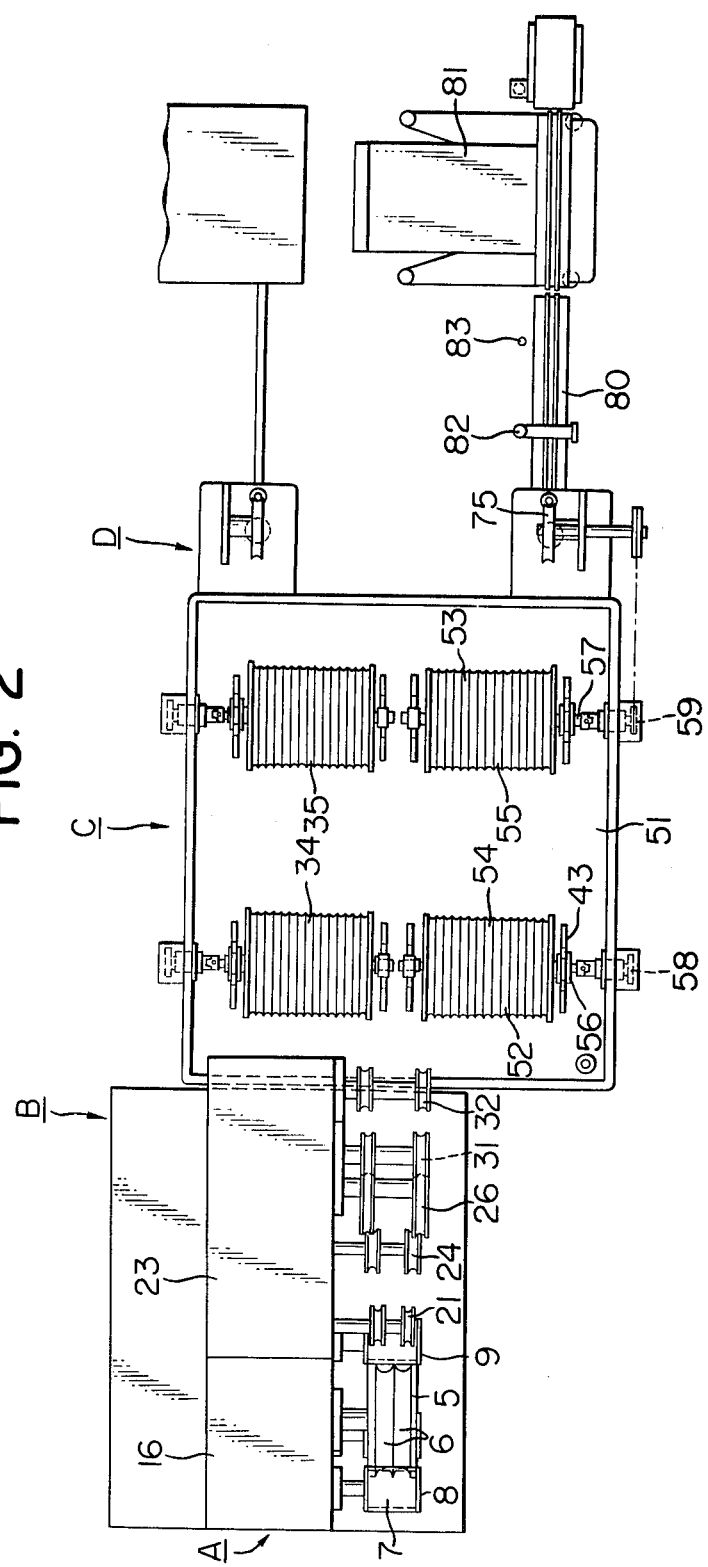
FIG. 2 is a plan view of the apparatus of FIG. 1 from which part of the raw material supplying apparatus has been taken away.
Figure 3:
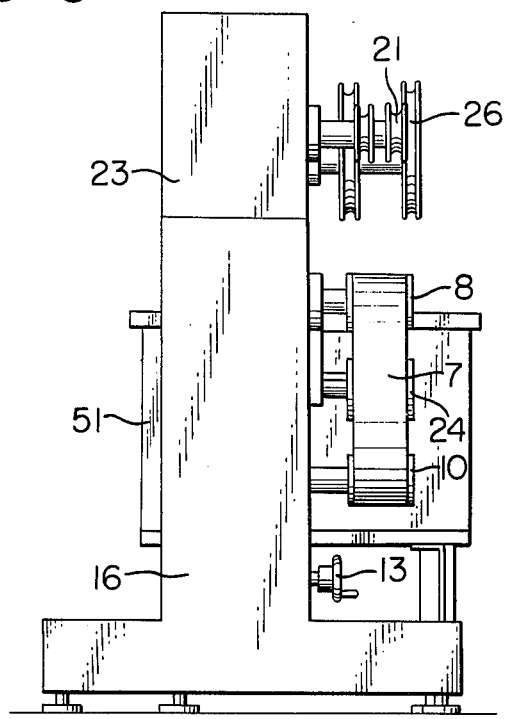
FIG. 3 is a left side elevation of the apparatus illustrated in FIG. 1.

In the exemplary embodiment of this invention as disclosed in the drawing, two pieces of products are to be obtained at one operation. However, this merely means that the same two systems are installed concurrently. In view of this, explanation will be made hereinafter on one of these two.

Raw material supplying apparatus (A)

The respective members constituting this supplying apparatus (A) are attached to a frame portion 16. Numeral 1 denotes a raw material supplying pipe whose outlet is connected with a drum-like coupling 2 made from an elastic substance such as rubber or the like, and the outlet of this coupling 2 is connected with a nozzle 3. A displacement sensor 4 is disposed with its detecting rod tip abutting on the outer wall of the coupling 2.

A drive roller 5 is rotatably attached to the frame portion 16 at a place opposite to the outlet of nozzle 3, said roller 5 having a circular groove 6 congruent with the configuration of cheese and being driven by means of a driving mechanism (not shown), and an endless belt 7 is disposed so as to shift concurrently along the surface of the groove 6 in the lower part of said roller 5.

This belt 7 is stretched between a pair of guide pulleys 8, 9 disposed substantially symmetrically on both sides above the roller 5 and a guide pulley 10 disposed under the roller 5. And, between the groove 6 of the roller 5 and belt 7 wound around the pulley 8 there is formed a cheese inlet 14 at a place opposed to the outlet of the nozzle 3. On the other hand, between the groove 6 of the roller 5 and the belt 7 wound around the pulley 9 there is formed a cheese outlet 15. Thus, the cheese supplied to the inlet 14 is discharged from the outlet 15 in the form of cheese rope (a).

A vertical threaded shaft 12 is screw-fitted in a supporting shaft 11 of the pulley 10. And, this threaded shaft 12 is turned through a suitable mechanism with turning of an adjust handle 13 which is attached with freedom of turning to the frame portion 16 so as to shift the location of the pulley 10 vertically, whereby the tension applied on the belt 7 can be adjusted.

Extension apparatus (B)

The respective members constituting this extension apparatus (B) are attached to a frame portion 23 adjacent to the frame portion 16.

In the inclined upper part of the cheese outlet 15 formed between the roller 5 and the belt 7 wound around the pulley 9 and in the inclined lower part thereof there are rotatably provided rollers 21, 24 respectively, said rollers 21, 24 being each provided with a circular groove. To supporting shafts 22, 25 of rollers 21, 24 there are screw-fitted threaded shafts 27, 28 in the exactly same manner as the supporting shaft 11 of the roller 8. And, rollers 21, 24 are arranged to shift vertically by the turning of adjust handles 29, 30.

Above and frontwardly of the roller 24 there is disposed a drive roller 26 having a circular groove. Below and frontwardly of the drum roler 26 there are disposed drive rollers 31, 32 having each a circular groove. These rollers are designed to be driven always at the same peripheral speed by a driving mechanism (not shown) respectively.

The peripheral speed of these rollers 26, 31, 32 may be increased more than the peripheral speed of the roller 5, depending on the extension rate of said cheese rope (a).

Figure 4:
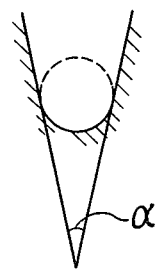
FIG. 4 is a fragmentary sectional view of the configurations of the disc and roller groove of the extension apparatus of the manufacturing apparatus illustrated in FIG. 1.

FIG. 4 illustrates the sectional groove configuration of rollers 21, 24, 26, 31, 32 employed for obtaining round bar-shaped cheeses, wherein the preferable included angle $\alpha$ is normally in the range of 30°–40°.

Figure 5:
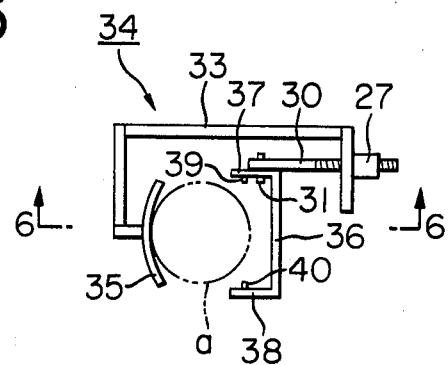
FIG. 5 is a front view of the cheese rope diameter measuring apparatus of the extension apparatus of the manufacturing apparatus illustrated in FIG. 1.
Figure 6:
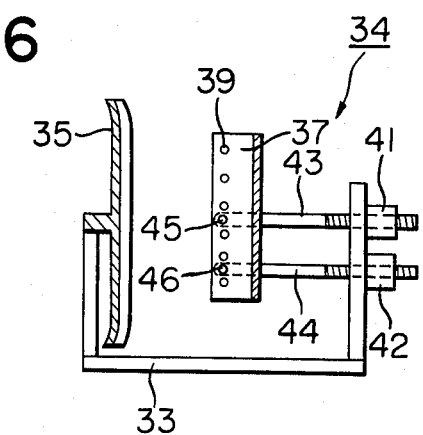
FIG. 6 is a sectional view of FIG. 5 taken on line 6—6 of FIG. 5.
Figure 7:
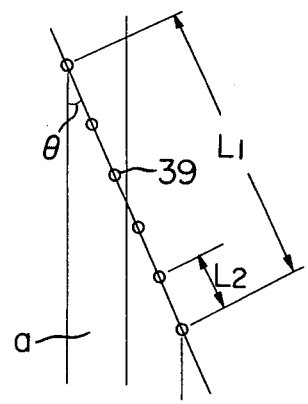
FIG. 7 is a view illustrating the measuring principle of the diameter measuring apparatus of FIG. 5.

Between the roller 26 and the roller 31 there is disposed a diameter measuring apparatus 34 for measuring the diameter of the cheese rope (a) continuously. Particulars of this diameter measuring apparatus 34 are illustrated in FIG. 5 to FIG. 7, wherein a guide plate 35 and a sensing means 36 are provided holding the passageway for cheese rope (a) therebetween. The sensing means 36 comprises a base plate and a pair of side plates 37, 38 projected at a right angle to the base plate respectively. As shown in FIG. 7, a plurality of projectors 39 are disposed in a vertical line on the side plate 37 at regular intervals $L_2$, covering the total length $L_1$. Receivers 40 are disposed on the side plate 38 at places opposed to these projectors 39. The thus constructed sensing means 36 is hinged at forward end portions of spindles 43, 44 of a pair of micrometers 41, 42 attached to the supporting frame 33.

As the sensing means 36 there can be employed for instance a sensing means using a leather diode or the like whose measuring range and sensitivity can be controlled by changing its inclined angle ($\theta$). This will be explained with reference to FIG. 7. That is, the measuring range, i.e., the range of change in diameter of the cheese rope (a), is about 0 to $L_1 \sin \theta$ and the sensitivity is about $L_2 \sin \theta$. And, when the thickness of beam is for instance about 0.1 mm, the space between beams is 5 mm or thereabouts.

The same one as the above-mentioned diameter measuring apparatus 34 may be provided between rollers 24 and 26 or between rollers 21 and 24. In this instance, this diameter measuring apparatus not shown in the drawing serves as a main diameter measuring apparatus, while the diameter measuring apparatus 34 shown in the drawing serves as an auxiliary one. In other words, the peripheral speed of roller 26 is controlled by using the main diameter measuring apparatus, while the auxiliary diameter measuring apparatus operates to increase the peripheral speed of rollers 31, 32 thereby to further decrease the diameter of the cheese rope (a).

Cooling apparatus (C)

A cooling tank 51 is installed adjacent to the frame portion 23. Within this tank, a pair of drums 52, 53 are disposed rotatably at a distance therebetween in front and in the rear of the tank. The surfaces of drums 52, 53 are provided with grooves 54, 55 congruent with the configuration of the cheese rope (a) respectively.

Pulleys 58, 59 are fitted on the end portions, projected out of the tank, of shafts 56, 57 of drums 52, 53. Between these pulleys and pulleys 60, 61 fitted on motor shafts 62, 63 there are spread belts 64, 65 respectively.

In order to wind the cheese rope (a) around each drum 52, 53, a guide cord (not shown) must be attached to each drum and a member for mounting the cheese rope on the guide cord must be attached to the forward end portion of the cheese rope. However, since it is difficult to do this attaching operation while drums are rotating, it is preferable for an unskilled worker to stop the rotation of drums temporarily at that time. For that purpose, a temporary stop clutch (not shown) is provided respectively between motors and pulleys 58, 59. This clutch is disengaged temporarily when the cheese rope (a) has deviated from drums 52, 53 or the like. In this instance, the succeeding cheese rope (a) is recovered this side of the drum 52.

Cutting apparatus (D)

A cutting apparatus (D) is supported on a bracket 71 secured to the forward side plate of the cooling tank 51. To the supporting plate erected on the bracket 71 there is attached a pulley 73 driven through a belt 72 from the pulley 59 within the cooling tank 51. A guide roller 75 having a circular groove is fitted on a shaft 74 of said pulley 73. Guide cylinders 78, 79 are provided on both sides of the horizontal plate portion of the bracket 71 for the purpose of guiding the cheese rope (a) hanging down over the roller 75 and passing through said horizontal plate portion.

Between the horizontal plate portion and the upper guide cylinder 78 there is formed a gap where a rotary cutter 76 is provided which is operated by a motor not shown herein. A measuring apparatus 77 is disposed below said rotary cutter.

Numeral 80 denotes a conveyor disposed below the cutter 76. This conveyor 80 is provided with a weight checker 81. If necessary, the conveyor 80 may be provided with a washing shower 82 or an air sprayer 83.

Operation

In the manufacturing apparatus as mentioned above, the cheese obtained by curding cow's milk such as whole milk or skim milk by adding a coagulating agent thereto and removing whey from the resulting curds is supplied to the coupling 2 through the pipe 1 of the raw material supplying apparatus (A) by means of a cheese feeding pump (not shown). Then, the cheese is supplied from this coupling 2 to the groove 6 of the roller 5 through the nozzle 3 and the inlet 14 comprising the roller 5 and the belt 7.

In this instance, when the quantity of raw material to be supplied from the pipe 1 is excessive, the raw material is liable to reside within the coupling 2 and consequently the coupling 2 expands. The displacement sensor 4 senses it and controls the cheese feeding pump to thus reduce the quantity of raw material supplied, whereby the coupling 2 contracts. On the other hand, when the coupling 2 thus contracts and the quantity of raw material supplied becomes below the fixed quantity, the feeding pump is controlled so as to increase the quantity of raw material supplied. Thus, the coupling 2 serves as a kind of buffer. Therefore, any other construction which serves as a buffer may be employed.

The cheese thus supplied to the inlet 14 is held in the groove 6 and carried by the belt 7, is discharged from the outlet in the form of cheese rope (a), and is introduced in the roller 21 of the extension apparatus (B).

In this extension apparatus (B), said cheese rope (a) is wound successively around rollers 24, 26, 31, 32 and discharged towards the cooling apparatus (C), during which the cheese rope (a) is stretched by rollers 26, 31, 32 whose peripheral speed is faster than that of the roller 5 and is thus invested with fiber strength in proportion to the resulting tension as well as the diameter of cheese rope (a) is reduced in proportion to the peripheral speed ratio between both rollers. The ratio of the diameter of cheese rope (a) supplied to the extension apparatus (B) to the diameter of cheese rope (a) discharged from said apparatus is arranged to be in the range of 2-8:1, preferably 3-6:1, and the sectional areas of grooves of rollers 5, 26 are also determined so as to meet aforesaid diameter ratio. The diameter of this cheese rope (a) is measured by means of the diameter measuring apparatus 34. The peripheral speed of rollers is changed on the basis of the measured results for the purpose of controlling the diameter of cheese rope (a). In this instance, adequate consideration naturally should be given to the factors, namely: sliding degree between cheese rope (a) and each roller, diameter of each roller, configuration of groove of each roller, contact area of each roller and the like.

In addition, the travelling distance of cheese rope (a) within the extension apparatus (B) is arranged to be lengthened or shortened in accordance with the hardness of cheese rope (a). This can be achieved by controlling the location of roller 21 and/or 24. In other words, when the cheese is hard, it must be extended slowly spending sufficient time in order to prevent the cheese rope (a) from breaking. For this purpose, the roller 21 is ascended, while the roller 24 is descended, and when the cheese is soft, it must be extended quickly and in a short time in order to prevent the cheese rope (a) from extending too much and hanging down. For this purpose, the arrangement of said rollers is reversed.

The cheese rope (a) thus extended within the extension apparatus (B) is introduced into the cooling tank 51 filled with cooling water of the cooling apparatus (C).

The cheese rope (a) introduced into the cooling tank 51 is wound successively with an endless guide cord around grooves 54, 55 of drums 52, 53 in the cooling water, and then is discharged towards the cutting apparatus (D).

This cooling treatment is done for solidifying the cheese rope (a) so that it is not deformed on the occasion of cutting, and the number of grooves is determined so that the cheese rope (a) may reside within the cooling tank 51 during the time required for its solidification.

The cheese rope (a) thus supplied to the cutting apparatus (D) is guided on the roller 75, then passes through guide cylinders 78, 79 and descends, is measured by means of the measuring apparatus 77, and is cut by means of the cutter 76 which is designed to operate when the measuring apparatus 77 senses that the cheese rope (a) has fixed dimensions. The thus cut cheese sticks drop onto the conveyor 80 and are carried thereon, during which is needed, said sticks are washed with the washing shower 82, then dried with the air sprayer and further weighed with the weight checker 81.

Although particular preferred embodiments of this invention have been disclosed hereinabove for purposes of illustration, it will be understood that variations or modifications thereof which lie within the scope of the invention as defined by the appended claims are fully contemplated.

What is claimed is:

1. An apparatus for continuously manufacturing a high protein food of fibrous form, comprising:
   a raw material supplying device comprising a pipe adapted to be connected to a supply of milk curds, a nozzle connected for receiving curds from said pipe and having an outlet for discharging the curds in the form of a continuous rope, a first driven roller disposed adjacent to the outlet of said nozzle, said first roller having a circular groove in the periphery thereof, said groove being movable past the outlet of said nozzle and being adapted to receive the rope from said nozzle and transport it away from said nozzle, an endless belt having a first reach disposed adjacent to and opposed to the periphery of said first roller and adapted to move therewith whereby to maintain the rope within said groove, the end of said first reach of said belt adjacent to said nozzle defining with said first roller an inlet for receiving the rope from said nozzle and the opposite end of said upper reach of said belt defining with said first roller an outlet for discharging the rope having an controlled cross-sectional size from said raw material supplying device;

an extension device for receiving the rope from said outlet of said raw material supplying device and for drawing the rope to extend the length thereof and thereby reduce the cross-sectional size thereof, said extension device comprising guide roller means for guiding the rope and driven roller means for moving the rope at a speed faster than the peripheral speed of said first roller of said raw material supplying device whereby to stretch the rope;

a cooling device connected for receiving the rope after it has passed through said extension device, said cooling device including a cooling tank adapted to contain a coolant, and means for feeding the rope through said cooling tank whereby to cool the rope; and a cutter device for receiving the rope from said cooling device and including a cutter for cutting the rope into fixed lengths.

2. An apparatus according to claim 1, wherein said raw material supplying device further includes a coupling connected between said pipe and said nozzle, said coupling being made from an elastic substance and functioning as a buffer for smoothing variations in the rate of feeding milk curds from said pipe into said nozzle.

3. An apparatus according to claim 1, wherein said extension device includes measuring means for measuring the diameter of the rope as it passes around said driven roller means.

4. An apparatus according to claim 1, wherein said cooling device further includes at least a pair of driven drums disposed within said cooling tank and provided with grooves for winding the rope therearound and moving same therealong.

5. An apparatus according to claim 4, wherein said cooling device further includes a cord provided between grooves of said drums for guiding the rope and clutches for interrupting driving of said drums.

6. An apparatus according to claim 1, wherein said cutting device further includes a second roller for receiving the rope from said cooling device so that the free end portion of the rope hangs down from said second roller, and a measuring apparatus for measuring the length of the free end portion of the rope and operating said cutter on sensing that the free end portion of the rope has a selected length.

7. An apparatus for continuously manufacturing a high protein food of fibrous form, comprising:

a raw material supplying device comprising a pipe adapted to be connected to a supply of milk curds, a nozzle connected for receiving curds from said pipe and having an outlet for discharging the curds in the form of a continuous rope, a first driven roller disposed below the outlet of said nozzle, said first roller being rotatable about a horizontal axis and having a circular groove in the periphery thereof, said groove being movable past the outlet of said nozzle and being adapted to receive the rope and transport it downwardly away from said nozzle, an endless belt disposed below said first roller and having an upper reach bearing against the periphery of the portion of said first roller located below the outlet of said nozzle and being adapted to move with said first roller whereby to maintain the rope within said groove, the end of said upper reach of said belt adjacent said nozzle defining with said first roller an upwardly opening inlet for receiving the rope from said nozzle and the opposite end of said upper reach of said belt defining with said first roller an upwardly opening outlet for discharging the rope having a controlled cross-sectional size from said raw material supplying device;

an extension device for receiving the rope from said outlet of said raw material supplying device and for drawing the rope to extend the length thereof and thereby reduce the cross-sectional size thereof, said extension device comprising a first freely rotatable guide roller located above said outlet of said raw material supplying device, a second freely rotatable guide roller located below said first guide roller, second, third and fourth driven rollers which are vertically spaced from each other and are driven at the same peripheral speed as each other which peripheral speed is faster than the peripheral speed of said first driven roller so that the rope is moved at a speed faster than the peripheral speed of said first driven roller whereby to stretch the rope, the first and second guide rollers and the second, third and fourth driven rollers being arranged so that the rope can be moved through a sinuous path lying in a vertical plane which path extends to and around said first guide roller, then said second guide roller, then said second, third and fourth driven rollers in series, all of said first and second guide rollers and said second, third and fourth driving rollers being rotatable about parallel, horizontal axes, said extension device including means for adjusting the vertical positions of said first and second guide rollers;

a cooling device connected for receiving the rope after it has passed through said extension device, said cooling device including a cooling tank adapted to contain a coolant, and drum means for feeding the rope through said cooling tank whereby to cool the rope; and a cutter device for receiving the milk curd rope from said cooling device and including a cutter for cutting the milk curd rope into fixed lengths.

* * * * *